(No Model.)
H. J. BARRY.
MOUSE TRAP.
No. 429,254. Patented June 3, 1890.
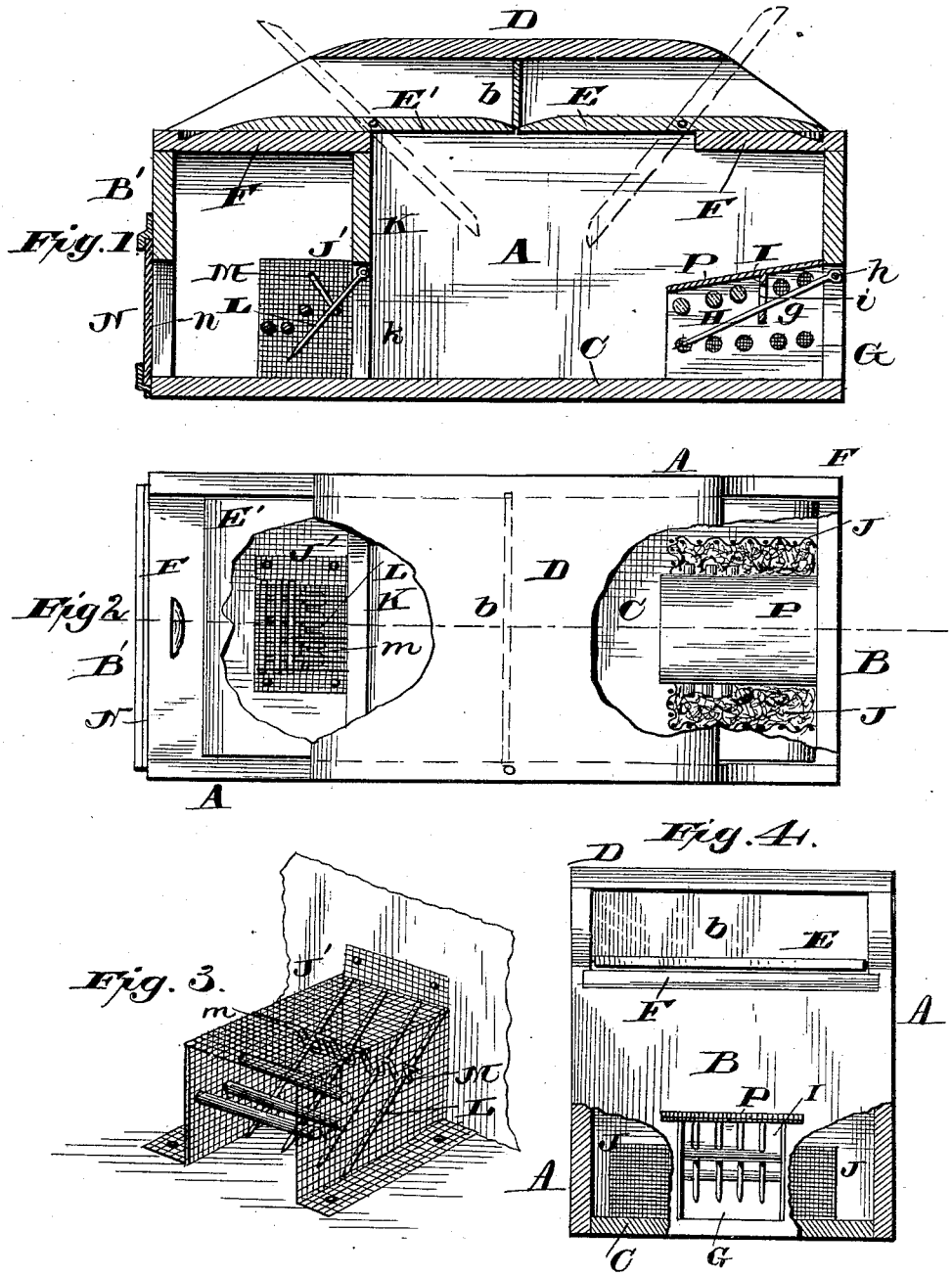
WITNESSES
F. L. Ouraud
Van Buren Hillyard
INVENTOR
Homer Jefferson Barry.
By R. S. & A. F. Lacey
Attorneys

UNITED STATES PATENT OFFICE.

HOMER JEFFERSON BARRY, OF FARGO, MICHIGAN.

MOUSE-TRAP.

SPECIFICATION forming part of Letters Patent No. 429,254, dated June 3, 1890.

Application filed February 18, 1890. Serial No. 340,876. (No model.)

*To all whom it may concern:*

Be it known that I, HOMER JEFFERSON BARRY, a citizen of the United States, residing at Fargo, in the county of St. Clair and State of Michigan, have invented certain new and useful Improvements in Mouse-Traps; and I do hereby declare the following to be a full, clear, and exact description of the invention, such as will enable others skilled in the art to which it appertains to make and use the same.

This invention relates to animal-traps, and most particularly to that class which are self-set and ever set.

The object of this invention is to provide a trap that will be simple and efficient, and which will tempt the animal and ensnare him before he is fully aware of the dangers that beset him. The bait-box is arranged upon either or both sides of the entrance, and is closed on the side adjacent the said entrance by a perforated wall, the perforations being of such a size as to permit the animal to nearly reach the bait, thereby luring him into the trap. The trap is provided at one end, the end opposite the entrance, with a receiving-compartment, into which the animals collect and from which they are removed through a glass door.

The improvement consists of the novel features, which hereinafter will be more fully described and claimed, and which are shown in the accompanying drawings, in which—

Figure 1 is a vertical central longitudinal section of a trap embodying my invention, showing the operation of the trap-doors by dotted lines. Fig. 2 is a top plan view, parts being broken away, showing the bait-box at the entrance end of the trap and the guard at the entrance to the receiving-compartment. Fig. 3 is a detail view of the guard in the receiving-compartment. Fig. 4 is a front view, parts being broken away, of the trap.

The case comprises sides A, ends B and B' and bottom C. The sides A project some distance above the tops of the ends B and B' and are closed on the top by the cover D. The two trap-doors E and E', arranged about on a level with the tops of the ends B and B', extend between the sides A, and their inner ends meet about midway between the ends of the trap. The glass partition $b$, arranged in line with the meeting ends of the trap-doors E and E', prevents an animal from running through the space between the cover D and the trap-doors E and E'. The trap-doors are journaled at their edges in the sides A, and are heavier at their outer ends to close after the animal has depressed their inner ends and been precipitated into the trap. The sliding doors F and F' close the space between the ends B and B' and the journals of the doors E and E', respectively, so that when the inner ends of said doors are depressed no space will be provided for the escape of the entrapped animals. The end B is provided with opening G. On each side of this opening are arranged perforated walls $g$, which extend back into the trap some distance. A series of downwardly-inclined needles H are arranged over the space between these two perforated walls, being pivotally supported at their upper ends on the rod $h$ at the top of the said opening G, and limited in their downward movement by passing through slots $i$ in the stop-plate I, depending from the plate P, which extends over the space between the said walls $g$ $g$ and is supported thereon. The bait-boxes J are placed upon either side of the opening G, and the perforated walls form one side thereof. The perforated walls $g$ $g$, projecting in from the sides of the opening G, form a passage between them through which the animal passes to gain entrance into the trap. The needles H ride over the animal as he enters the trap through the said passage and prod him if he attempts to escape, thereby preventing his escape. The animal sniffs the bait through the openings in the walls $g$ $g$, and is thus lured on until trapped.

The vertical partition K divides the trap into two compartments, the entrance and the receiving compartments, the latter retaining the animals until a disposition is to be made thereof. The opening $k$ in this partition K is protected by the wire guard J' and the inclined needles L, the latter being limited in their downward movement and spaced apart by the wire stop M, which is bent in a series of return folds $m$.

The end B' is provided with an opening $n$, which is closed by the glass door N. This opening $n$ is opposite the opening $k$ in the partition K, and the animal in the entrance-chamber seeing the light in the receiving-compartment enters the same, and is held captive therein until disposed of.

Having thus described my invention, what I claim, and desire to secure by Letters Patent, is—

1. In an animal-trap, the combination, with the case having an entrance-opening, of perforated walls on each side of the said opening, and the bait-receptacle on the inner side of the said perforated walls, substantially as described.

2. In an animal-trap, the combination, with bait-boxes on each side of the entrance-opening, of perforated walls on each side of the said opening forming a side of the said bait-boxes, substantially as described.

3. In an animal-trap, the combination, with the case having cover D, of the two trap-doors placed below the cover, and the glass partition arranged in line with the meeting ends of the said doors, substantially as and for the purpose described.

4. In an animal-trap, the combination, with the case and the two trap-doors, of the sliding doors F and F', closing the space between the front ends of the case and the front portions of the said trap-doors, substantially as and for the purpose described.

5. In an animal-trap, the combination, with a wall having an entrance, as $k$, and a guard projecting from the sides of the said entrance, of the needles L, pivotally supported at the upper end of the said entrance $k$ and inclining downwardly, and the stop M, bent in a series of return folds and adapted to limit the downward movement of the said needles, substantially as set forth.

6. The herein-specified trap, composed of the case having its sides higher than the ends and closed by cover D, the trap-doors E and E', about on a level with the tops of the ends and placed some distance below cover D, glass partition $b$ in line with the inner ends of doors E and E', sliding doors F below the front portions of doors E and E', the perforated walls on each side of the entrance-opening, the bait-boxes on each side of said perforated walls and the needles between them, the partition K, the guard and needles protecting the opening in partition K, and the glass door closing an opening in the end B' of the case, substantially as specified.

In testimony whereof I affix my signature in presence of two witnesses.

HOMER JEFFERSON BARRY.

Witnesses:
J. H. BARTLETT,
L. C. DILLREE.